United States Patent
Dom et al.

(10) Patent No.: US 10,022,895 B2
(45) Date of Patent: Jul. 17, 2018

(54) TIRE BEAD WIRE REMOVER

(71) Applicants: Thomas G Dom, Kingman, AZ (US);
Alex J Dom, Kingman, AZ (US);
Matthew R Dom, Kingman, AZ (US)

(72) Inventors: Thomas G Dom, Kingman, AZ (US);
Alex J Dom, Kingman, AZ (US);
Matthew R Dom, Kingman, AZ (US)

( * ) Notice: Subject to any disclaimer, the term of this patent is extended or adjusted under 35 U.S.C. 154(b) by 161 days.

(21) Appl. No.: 15/225,938

(22) Filed: Aug. 2, 2016

(65) Prior Publication Data
US 2018/0036915 A1   Feb. 8, 2018

(51) Int. Cl.
*B26D 3/00*   (2006.01)
*B29B 17/02*   (2006.01)
*B29L 30/00*   (2006.01)

(52) U.S. Cl.
CPC .............. *B29B 17/02* (2013.01); *B26D 3/005* (2013.01); *B29B 2017/0268* (2013.01); *B29L 2030/00* (2013.01)

(58) Field of Classification Search
CPC .................... B26D 3/005; B29B 2017/0268
USPC .............................................. 83/951
See application file for complete search history.

(56) References Cited

U.S. PATENT DOCUMENTS

| | | | | |
|---|---|---|---|---|
| 1,412,951 A * | 4/1922 | Maxwell | ................. | B26D 1/24 82/57 |
| 2,230,302 A * | 2/1941 | Leguillon | .............. | B26D 3/005 157/13 |
| 2,298,685 A * | 10/1942 | Davis | .................... | B26D 3/005 157/13 |
| 3,733,941 A * | 5/1973 | Geyer, Jr. | ............... | B23B 31/16 157/13 |
| 4,072,072 A * | 2/1978 | Harb | ....................... | B26D 1/24 157/13 |
| 4,134,316 A * | 1/1979 | Bullinger | ............... | B26D 3/005 157/13 |
| 4,770,077 A * | 9/1988 | Garmater | ............... | B26D 3/005 157/13 |
| 4,873,759 A * | 10/1989 | Burch | .................... | B26D 3/005 241/DIG. 31 |
| 4,914,994 A * | 4/1990 | Barclay | .................. | B26D 3/005 83/175 |
| 5,319,834 A * | 6/1994 | Voigts | .................... | B26D 3/005 241/DIG. 31 |
| 6,234,055 B1 * | 5/2001 | Taylor | .................... | B23D 19/04 83/423 |
| 6,249,949 B1 * | 6/2001 | Cross, Jr. | ............... | B26D 3/005 29/403.3 |

* cited by examiner

*Primary Examiner* — Kenneth E Peterson

(57) ABSTRACT

A machine that removes the bead wires from tires for the purpose of reclaiming the wire and recycling of the tire. The bead of the tire is placed over a drive wheel and tension rollers, the tension rollers move away from the drive wheel which stretches the bead against the drive wheel. The drive wheel is driven by a drive system and causes the bead to rotate. As the bead rotates a blade contacts the inner periphery of the bead and severs the rubber and reinforcement material. Directly following the blade are two plates that are spaced apart approximately equal to the diameter of the bead wire. The plates push the rubber and reinforcement material off of the bead wire as the bead rotates.

1 Claim, 1 Drawing Sheet

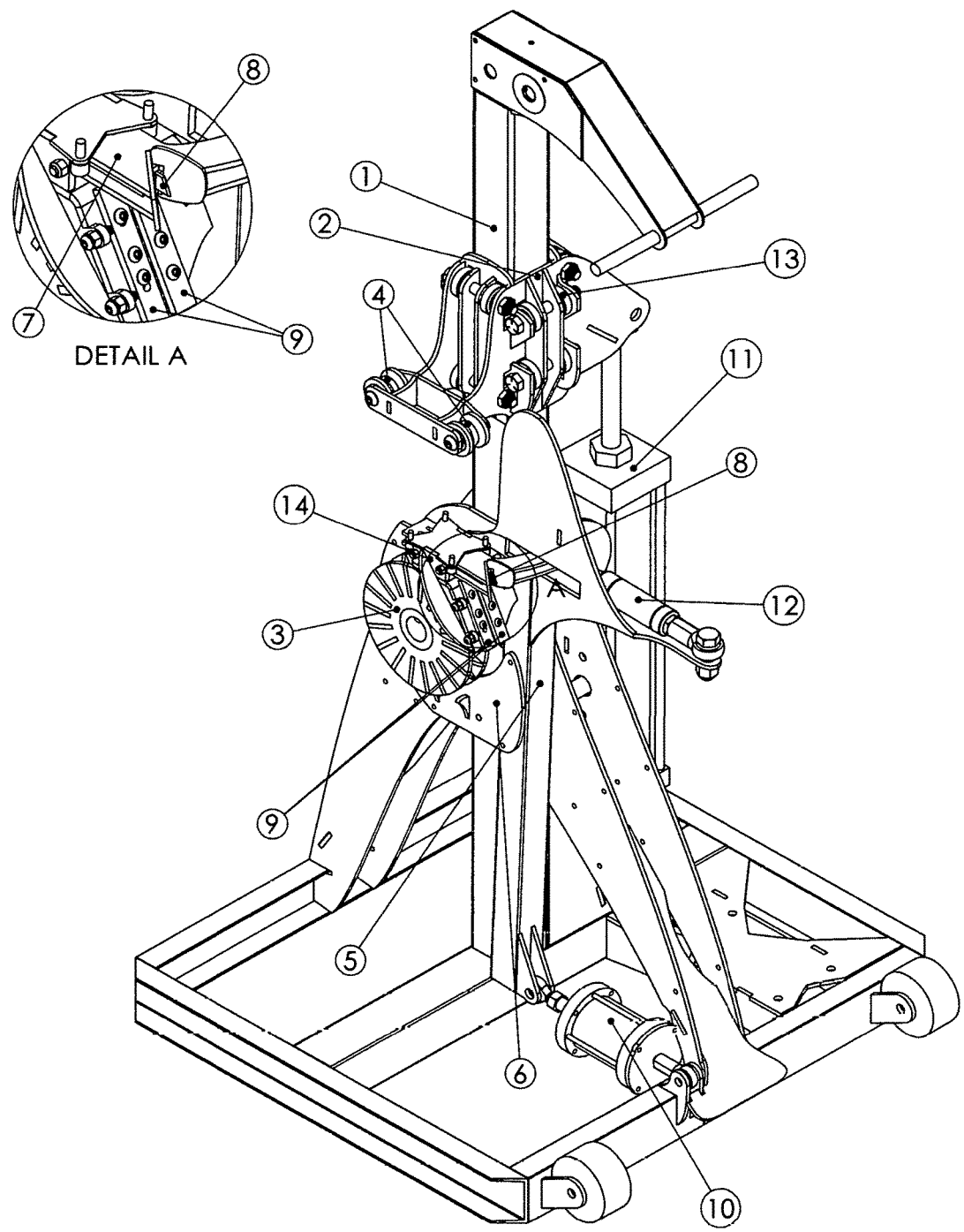

TIRE BEAD WIRE REMOVER

CROSS-REFERENCE TO RELATED APPLICATIONS

| | | |
|---|---|---|
| 4,873,759 | October 1989 | Burch |
| 5,319,834 | June 1994 | Voigts |
| 4,770,077 | September 1998 | Garmater |

STATEMENT REGARDING FEDERALLY SPONSORED RESEARCH OR DEVELOPMENT

Not Applicable

THE NAME OF THE PARTIES TO A JOINT RESEARCH AGREEMENT

Not Applicable

INCORPORATION-BY-REFERENCE OF MATERIAL SUBMITTED ON A COMPACT DISC OR A TEST FILE VIA THE OFFICE ELECTRONIC FILING SYSTEM

Not Applicable

STATEMENT REGARDING PRIOR DISCLOSURES BY THE INVENTOR OR A JOINT INVENTOR

Provisional application No. 62/282,684 filed Aug. 10, 2015 by Thomas Dom, Alex Dom, Matthew Dom

BACKGROUND OF THE INVENTION

Field of the Invention

The purpose of this machine is to remove the steel wire from the beads of tires. When tires have reached their end of life they must be processed for recycling or disposal. It is desirable to remove the bead wire prior to processing to either enhance the end product and/or reduce wear on the processing equipment.

Description of the Related Art

The machines that are currently available to remove the bead wire have one or more of the following undesirable traits; low production rate, high initial cost, poor product quality, large physical size. The machines such as those disclosed in the references of Voigt and Burch pull the bead through an aperture in a plate. The force required to pull the bead through the plate is very high which requires a heavy frame and heavy duty components that are expensive. Furthermore, the bead wires occasionally break and then remain in the tire. The machine disclosed by Garmater cuts the bead out at a distance up from the bead thereby leaving the bead wire fully encased with rubber and reinforcing material and therefore the steel bead wire cannot be reclaimed.

BRIEF SUMMARY OF THE INVENTION

The machine described in this disclosure removes the bead wire by using a three step process. First the bead rotates by means of a drive wheel and two tension rollers. The tension rollers stretch the bead against the drive wheel causing the bead to spin. Note that the bead may be attached to a whole tire or a portion of the tire such as the tire sidewall.

Shortly after the bead begins to rotate, a cutting blade that is located within the inner periphery of the tire bead moves in a radial outward direction into contact with the inner periphery of the bead and a cut is made through the rubber and reinforcing material that encases the bead wire. The third step involves a pair of stripping plates that force the rubber and reinforcing material off of the bead wire as it travels between the plates. All three steps occur simultaneously as the tire bead rotates. The resulting bead wire is at least 90% free of rubber.

BRIEF DESCRIPTION OF THE DRAWINGS

FIG. 1 is a perspective view of the machine that shows all of the essential elements

DETAILED DESCRIPTION OF THE INVENTION

The tire bead is installed over the tensions rollers 4 and the drive wheel 3. The drive wheel is in the form of a V groove wheel so that it will grab the tire bead as it is forced into the V groove. The drive wheel is mounted on a shaft which rides on bearings secured to the post 1 so that the center of the shaft coincides with the center of the post. A suitable drive system is connected to the shaft to apply rotational motion to the drive wheel.

The tension rollers 4 are mounted on the carriage assembly 2 at a fixed lateral distance from each other. These are also in the form of a V groove wheel but with smaller diameters than the drive wheel 3. The tension rollers rotate separately from each other on their own bearings and shafts. The carriage assembly 2 moves linearly on post 1 by means of guide rollers 13. The motion of the tension roller carriage assembly is such that it applies tension to the tire bead thus transmitting the rotational motion of the drive wheel to the tire bead. The tension rollers are initially close to the drive wheel so that the tire bead can be placed over the drive wheel and tension rollers. A suitable device shown as actuator 11 in the drawing applies the necessary force to the tension roller carriage assembly 2 to move it away from the drive wheel and thereby apply tension to the tire bead.

After tension has been applied to the tire bead and the bead is in motion, the cutting blade 8 and the stripping dies 9 work in unison to remove the wire. The cutting blade and the stripping dies are mounted within the inner diameter of the tire bead. Both are mounted on the arm 5 that rotates on the pivot 6 which is fixed to the post 1. The movement of the arm is controlled by the actuator 10. The arm rotates around the pivot in a clockwise direction (as viewed from the side of the machine shown in the drawing) so that the blade and stripping dies are made to contact the tire bead. The blade is located above the stripping dies so that the bead passes the blade before entering into the stripping dies. This ensures that the reinforcement material that encases the bead wire is severed before the bead contacts the stripping dies.

The blade is mounted in the blade carrier 7 that moves in an outward motion from the inside area of the tire bead. The blade carrier moves linearly within the carriage assembly 14 which is mounted to the arm 5. The blade carrier is actuated by the cutting blade actuator 12.

The stripping dies consist of two plates spaced apart a distance that approximately equals the diameter of the bead wire. The plates are oriented at an angle to the tangent of the bead wire. As the bead moves past the blade, the blade severs the reinforcement material. The stripping dies then push the rubber and reinforcement material off of the bead wire due to the movement of the arm which moves the dies outward. The bead wire continues to be removed as the bead rotates until the wire is completely removed.

We claim:

1. A machine that removes bead wires from tires consisting of a v-groove drive wheel mounted on a drive wheel shaft and drive wheel bearings, said bearings secured to a suitable frame, a drive system that applies rotational power to said shaft, a v-groove tension roller positioned above the drive wheel that rides on a tension roller bearing and a tension roller shaft that are mounted on a carriage assembly that moves in a direction away from the drive wheel by a pneumatic or hydraulic cylinder thereby causing the tire bead mountable in the v-grooves of the tension roller and drive wheel to be stretched tight around the drive wheel and tension roller so that the tire bead rotates, a cutting blade mounted within the inner diameter of the tire bead to a blade holder that causes the blade to move in a radial outward direction relative to the tire bead, a stripping die mounted within the inner diameter of the tire bead, the stripping die composed of two parallel plates that are mounted with a gap between the two parallel plates that allows only the bead wire to pass through and are fastened to an arm that allows the stripping die to move in a radial outward direction relative to the tire bead.

\* \* \* \* \*